(12) United States Patent
Corghi

(10) Patent No.: US 10,437,904 B2
(45) Date of Patent: Oct. 8, 2019

(54) WHEEL SERVICING METHOD AND SYSTEM

(71) Applicant: NEXION S.p.A., Corregio (Reggio Emilia) (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 0 days.

(21) Appl. No.: 15/963,696

(22) Filed: Apr. 26, 2018

(65) Prior Publication Data

US 2018/0314763 A1  Nov. 1, 2018

(30) Foreign Application Priority Data

Apr. 28, 2017 (IT) .......................... 102017000046689
Apr. 24, 2018 (EP) ..................................... 18169075

(51) Int. Cl.
*G06F 16/955* (2019.01)
*G06K 7/14* (2006.01)
*G01B 11/275* (2006.01)

(52) U.S. Cl.
CPC ........ *G06F 16/9554* (2019.01); *G01B 11/275* (2013.01); *G06K 7/1417* (2013.01); *G01B 2210/26* (2013.01)

(58) Field of Classification Search
CPC .......................... G06F 16/9554; G01B 11/275
See application file for complete search history.

(56) References Cited

U.S. PATENT DOCUMENTS

| 4,761,749 | A | 8/1988 | Titsworth et al. |
| 5,249,364 | A | 10/1993 | Bishop |
| 6,263,322 | B1 | 7/2001 | Kirkevold et al. |
| 7,648,062 | B2 | 1/2010 | Corniot |
| 2004/0164140 | A1 | 8/2004 | Voeller et al. |
| 2009/0255992 | A1* | 10/2009 | Shen ................ G06K 19/06037 235/462.1 |
| 2013/0071029 | A1* | 3/2013 | Terwilliger ............. H04L 67/36 382/183 |
| 2014/0288761 | A1* | 9/2014 | Butler ................... G07C 5/0816 701/29.6 |
| 2018/0093537 | A1* | 4/2018 | Yu ........................ B60C 23/0471 |
| 2018/0134529 | A1* | 5/2018 | Zecher ............... G01B 11/2755 |
| 2018/0158255 | A1* | 6/2018 | Garcia ................... B60Q 1/503 |
| 2018/0186345 | A1* | 7/2018 | Lo Presti ............... B60S 5/046 |

OTHER PUBLICATIONS

Search Report and Written Opinion issued in IT Patent Application No. IT2017700046689 having an IT filed Apr. 28, 2017, dated Dec. 21, 2017 (11 pgs).

\* cited by examiner

*Primary Examiner* — Thien M Le
*Assistant Examiner* — Asifa Habib
(74) *Attorney, Agent, or Firm* — Kraguljac Law Group, LLC

(57) ABSTRACT

A wheel servicing method, for a wheeled vehicle with tires coupled to respective rims, comprises a step of receiving, in a control unit provided with a processor and a memory, reference data uniquely correlated with the vehicle. The method also comprises a step of processing the reference data and generating image data representing a QR code and a step of transmitting the QR code to an output peripheral in order to make the code available to a user for subsequent displaying.

15 Claims, 6 Drawing Sheets

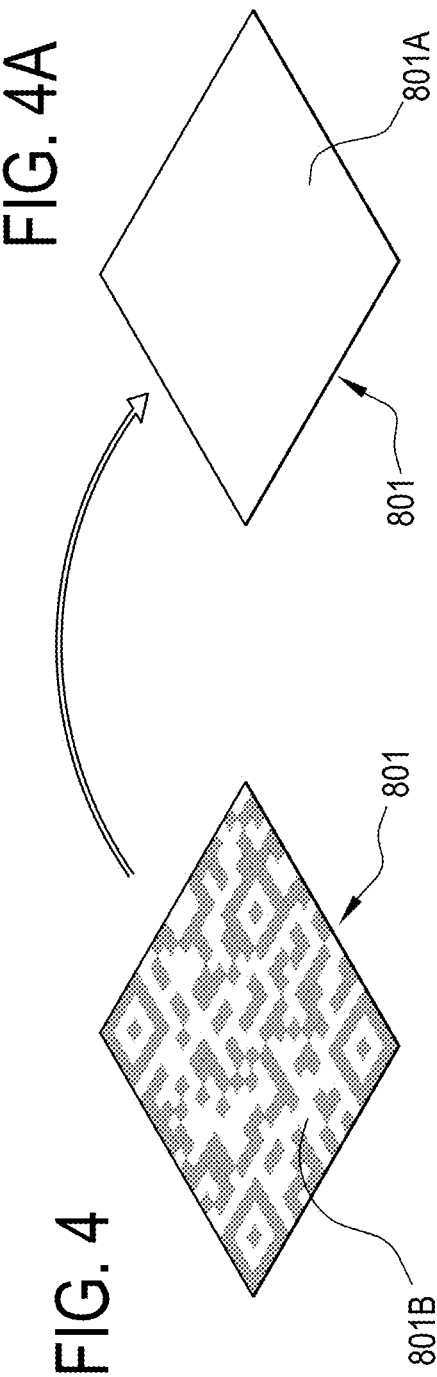
FIG. 4
FIG. 4A
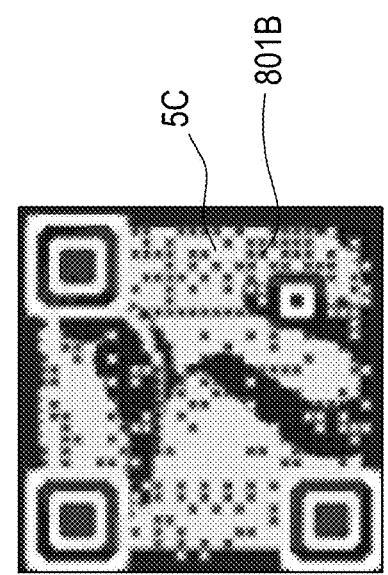
FIG. 5

WHEEL SERVICING METHOD AND SYSTEM

TECHNICAL FIELD OF THE INVENTION

This invention relates to a wheel servicing method and system.

More specifically, the invention addresses the technical field of servicing systems (for example, for maintenance, repair or inspection) applied to vehicle wheels, where the wheels comprise tyres coupled to respective rims.

In this field, a user (for example, a tyre mechanic) needs to collect data required for performing a diagnostic (or inspection) service on the wheel; for example, by measuring wheel alignment or balance.

The data needed to prepare a diagnostic report are parameters which depend on the vehicle type and on the specific vehicle and owner.

The process followed to obtain the diagnostic data is repeated each time the vehicle is subjected to diagnosis. This process is time-consuming.

BACKGROUND OF THE INVENTION

Patent document U.S. Pat. No. 6,263,322B1 discloses a wheel servicing system in which "relevant customer information" is entered preferably manually. From the same document, it is known that this information can be entered from a selection menu or using an input device such as a scanner or a barcode reader.

SUMMARY OF THE INVENTION

The aim of this invention is to provide a wheel servicing system and method to meet the above mentioned needs.

More particularly, the aim of this invention is to provide a wheel servicing system and method which allow diagnostic data relating to the wheels to be retrieved particularly easily.

These aims are fully achieved by the wheel servicing system and method forming the object of this invention and as characterized in the appended claims.

The method according to this description is a wheel servicing method for a wheeled vehicle with tyres coupled to respective rims.

The method includes a step of receiving, in a control unit, reference data uniquely correlated with the vehicle. The expression "uniquely correlated" is used to mean that the data are unambiguously related to a specific vehicle or vehicle type.

In one embodiment, the control unit may be provided with a processor. In one embodiment, the control unit may be provided with a memory. Alternatively, the control unit is connected to an external memory residing in a remote server.

The method includes a step of processing the reference data to generate image data representing a QR code containing at least the reference data. In other words, the method includes a step of processing the reference data and a step of generating image data representing a QR code containing at least the reference data. It should be noted that the expression "QR code" is used, generally speaking, to mean a code used to contain or store or represent the reference data; for example, a barcode, whether one-dimensional or two-dimensional, or a hologram or other multimedia objects used to store information which can be retrieved by means of a suitable reader. In a (preferred) embodiment, the reader is an optical reader.

It should be noted that the term "image data" is used to mean digital data whose conversion into display parameters allows obtaining an object which is visible to a user.

The method also includes a step of transmitting the QR code to an output peripheral. That way, the QR code is made available to a user for subsequent displaying.

Storing the reference data in the QR code and subsequently displaying it allow obtaining data useful for carrying out diagnostic operations on the vehicle (for example, measuring vehicle wheel alignment and preparing a relevant report) particularly quickly and easily. In particular, the QR code can be read rapidly and the data it contains, derived by reading the QR code, make it possible to quickly obtain the information useful for completing the report (such as, for example, the limits or tolerances for the alignment parameters measured).

This is useful for the tyre mechanic who must perform alignment or other checks on the vehicle and it might also be useful for the vehicle owner, for example to better interpret the results of the checks or measurements carried out by the tyre mechanic.

In one embodiment, the reference data include characteristic vehicle parameters necessary to perform diagnosis. In one embodiment, the reference data include information necessary to access a filing location in an electronic database which may contain the characteristic vehicle parameters.

In a further embodiment, the reference data may include information necessary to access a filing location in an electronic database, as well as the characteristic parameters themselves. The latter solution allows obtaining a data redundancy which reduces the probabilities of losing the data.

In one embodiment, the characteristic vehicle parameters comprise at least one of the following parameters (the list is provided by way of example and is not exhaustive): car code, wheel size, customer code, manufacturer, marque and model of vehicle, wheel parameters, tolerance range for wheel measurement data, vehicle identification code.

In one embodiment, the method includes a step of printing the QR code by means of the output peripheral. It should be noted that the term "printing" is used, broadly speaking, to mean making the code available to a user.

In one embodiment, printing is carried out on a paper substrate. In a preferred embodiment, the paper substrate is adhesive.

The use of a printed adhesive substrate makes it possible to attach the printed QR code to the vehicle, avoiding the risk of losing it.

In one embodiment, the method includes a step of capturing measurement data relating to at least one of the vehicle wheels. The term "measurement data" is used, broadly speaking, to mean data which are variable over time and which are quantifiable by means of measurements performed on the vehicle. In one embodiment, the measurement data include one or more of the following parameters: wheel toe; wheel camber; wheel caster; actual wheel size; residual wheel imbalance; wheel runout; wheel elasticity; wheel tyre tread depth; wheel tyre pressure.

The method includes a step of processing the measurement data as a function of the reference data.

The method also includes a step of including at least part of the measurement data, in addition to the reference data, in the image data representing the QR code.

In one embodiment, the method comprises a step of including the measurement data in the filing location of the electronic database which also contains the characteristic vehicle parameters.

In another embodiment, the measurement data are included both in the electronic database and in the image data representing the QR code. This solution allows obtaining a data redundancy which can avoid problems connected with data loss or impossibility of accessing the filing location in the electronic database.

This step of including at least part of the measurement data in the image data representing the QR code or saving the measurement data in the electronic database allows keeping track of the measurement data obtained in each diagnosis over time. Monitoring the data in this way makes it possible to create a measurement history which eventually allows weighting a series of maintenance actions specific for each vehicle. In one embodiment, the step of receiving the reference data is accomplished by reading the QR code and then deriving the image data representing at least the reference data. In one embodiment, the QR code (which is red to derive at least part of the reference data) is the QR code generated in the processing step. In one embodiment, the QR code (which is red to derive at least part of the reference data) can be a QR code different from the one generated in the processing step, e.g. a QR code which is provided on a corresponding support attached to the car or to the wheel; in this case, the image data representing the reference data are derived from said (additional) QR code. This allows speeding up data collection operations necessary for diagnosis.

In a variant embodiment of the method, the image data representing the QR code are integrated with other image data representing a logo in such a way as to form a QR code representing at least the reference data and depicting the logo. In other words, the QR code, while maintaining its function of storing the reference data, is configured, in graphic terms, to show a logo.

In a variant embodiment of the method, the output peripheral makes the QR code visible on a digital device through a user interface. The term "digital device" is used, broadly speaking, to mean any electronic device—for example a smartphone or a tablet—capable of receiving image data and making them displayable on its screen.

This solution makes the QR code available both in the form of an image and in digital form (image data), thus allowing the reference data to be read directly on the device.

The system according to this description is a wheel servicing system for a wheeled vehicle with tyres coupled to respective rims.

The system comprises a control unit. In one embodiment, the control unit may comprise a memory. In one embodiment, the control unit may comprise a processor. Alternatively, the memory may be located in an external server, either local or remote. The system comprises a user interface. In one embodiment, the user interface is connected to the control unit. In one embodiment, the user interface is configured to receive reference data uniquely correlated with a vehicle. In one embodiment, the user interface is configured to transmit the reference data to the control unit.

The system comprises an output peripheral connected to the control unit. In one embodiment, the control unit is programmed to process the reference data. In one embodiment, the control unit is programmed to generate image data representing a QR code. It should be noted that the expression "QR code" is used, generally speaking, to mean a code used to contain or store or represent at least the reference data; for example, a barcode, a hologram or other multimedia objects. In one embodiment, the control unit is programmed to transmit the QR code to the output peripheral.

The output peripheral is configured to make the code or multimedia object available to a user for displaying at a later stage.

An output peripheral which makes visible the QR code in which the reference data are contained or stored speeds up the operations for retrieving the data necessary for diagnosis because the QR code can be read rapidly to obtain the reference data it contains.

In one embodiment, the output peripheral is a printer. In one embodiment, the printer is configured to print the QR code on an adhesive substrate. Thus, the QR code can be attached to the vehicle where it won't be lost.

In one embodiment, the wheel servicing system comprises or more measuring devices. The one or more measuring devices are connected to the control unit and configured to capture wheel measurement data. In one embodiment, the control unit is programmed to process the measurement data. In one embodiment, the control unit is configured to generate image data representing the QR code in which the measurement data are also stored. This allows keeping a history of vehicle diagnoses which can, when necessary, be analysed to create maintenance procedures specific for each single car.

The wheel servicing system comprises a reader. The reader is configured to read the QR code. The reader is configured to derive the image data representing the reference data. This speeds up retrieval of the reference data which are automatically received by the control unit when the QR code is read. In one embodiment, the reader is a device dedicated specifically to reading the QR code. In one embodiment, the reader is a generic device capable of receiving image data, processing them and transmitting them to the control unit. In one embodiment, the "generic device" is a smartphone or a tablet programmed to capture the image of the QR code using its built-in camera, processing the image and transmitting the processed data to the control unit through one of the available communication channels. In one embodiment, the transmission of the data from the reader to the control unit is accomplished in wireless mode; for example, using radio, Bluetooth, Wi-Fi or like communication technology.

In one embodiment, the output peripheral is configured to make the QR code visible on a digital device through a user interface.

The wheel servicing system comprises a computer program. In one embodiment, the computer program comprises operating instructions configured to perform the steps of the wheel servicing method when run on the wheel servicing system.

BRIEF DESCRIPTION OF THE DRAWINGS

This and other features of the invention will become more apparent from the following description of a preferred embodiment of it, illustrated purely by way of example in the accompanying drawings, in which:

FIGS. 4 and 4A show a QR code printed on an adhesive substrate;
FIG. 5 shows a QR code.

DESCRIPTION OF THE PREFERRED EMBODIMENTS

Figure 1:
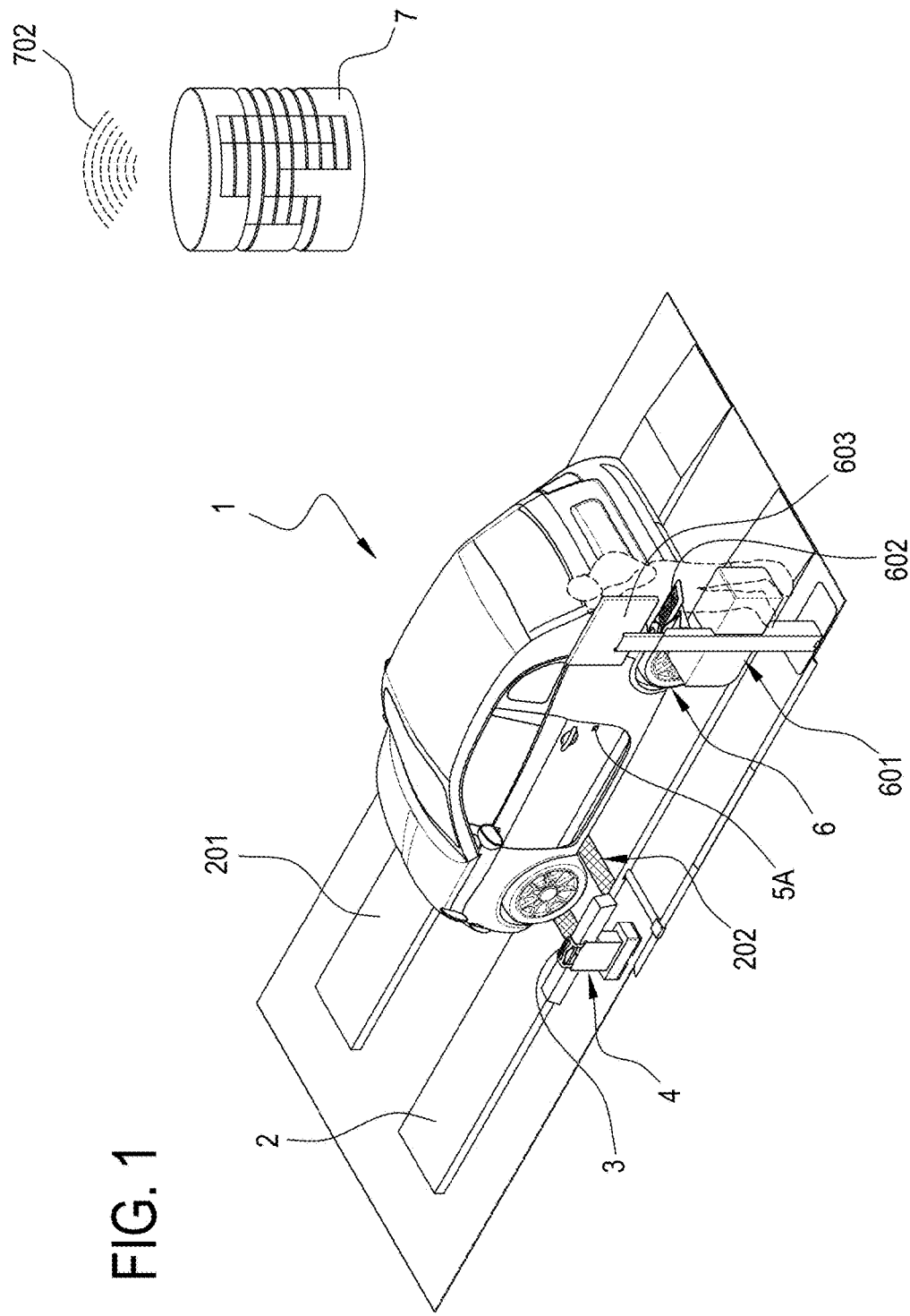
FIG. 1 illustrates a wheel servicing system.
Figure 2:
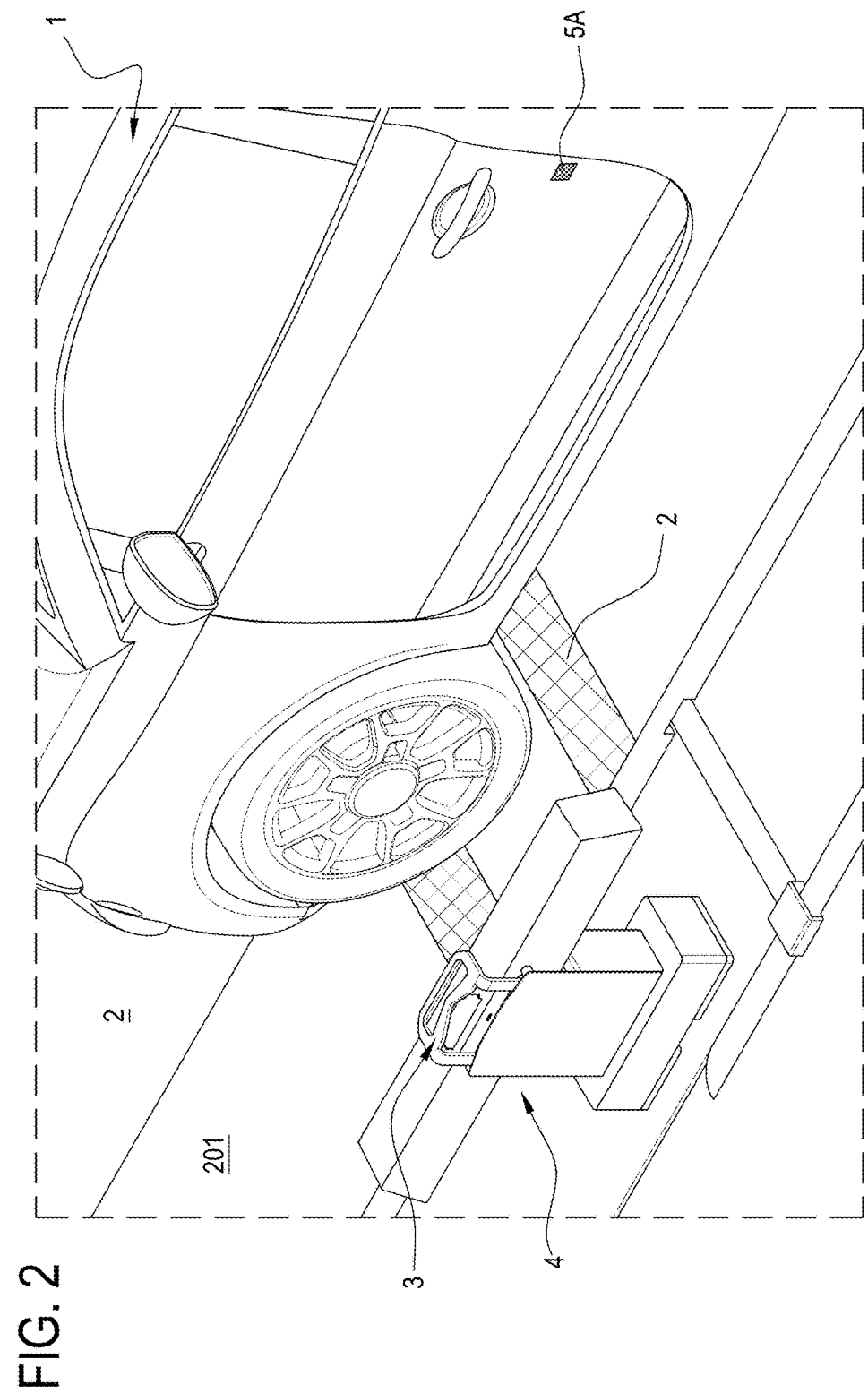
FIG. 2 illustrates a detail of the system of FIG. 1.
Figure 3:
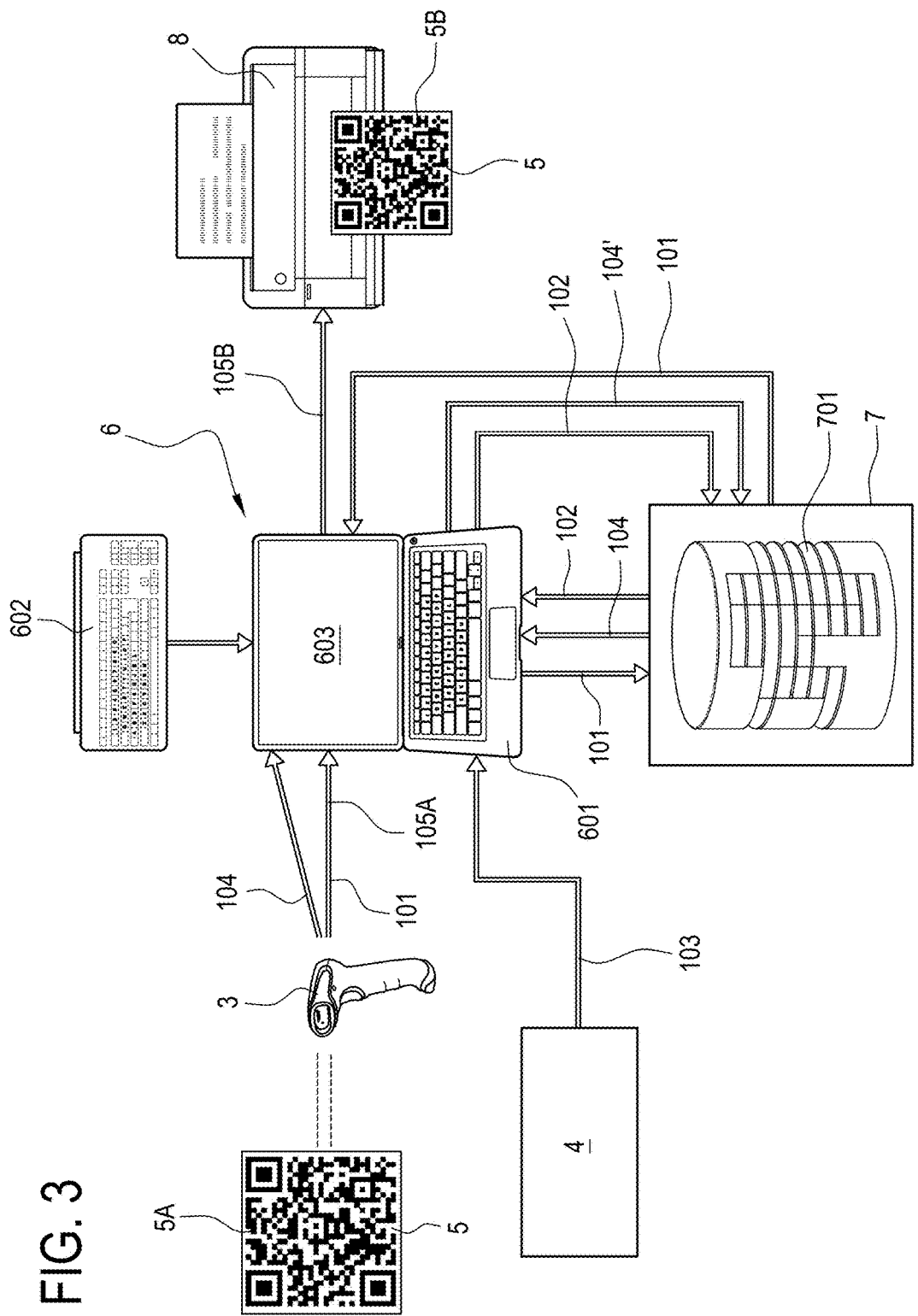
FIG. 3 is a functional diagram of the servicing system of FIG. 1.
Figure 6:
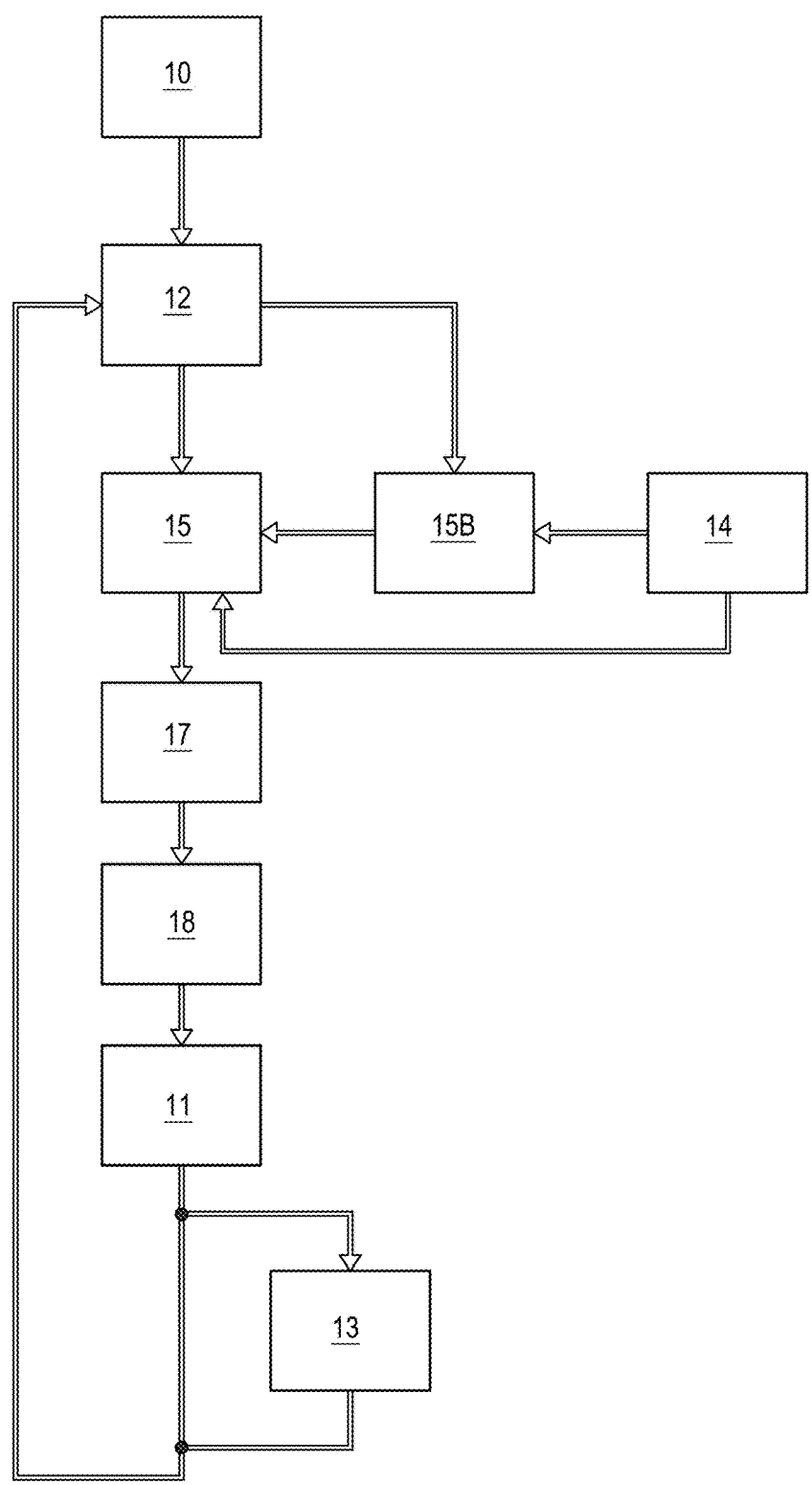
FIG. 6 shows the functional diagram of the wheel servicing method according to this description.
Figure 7:
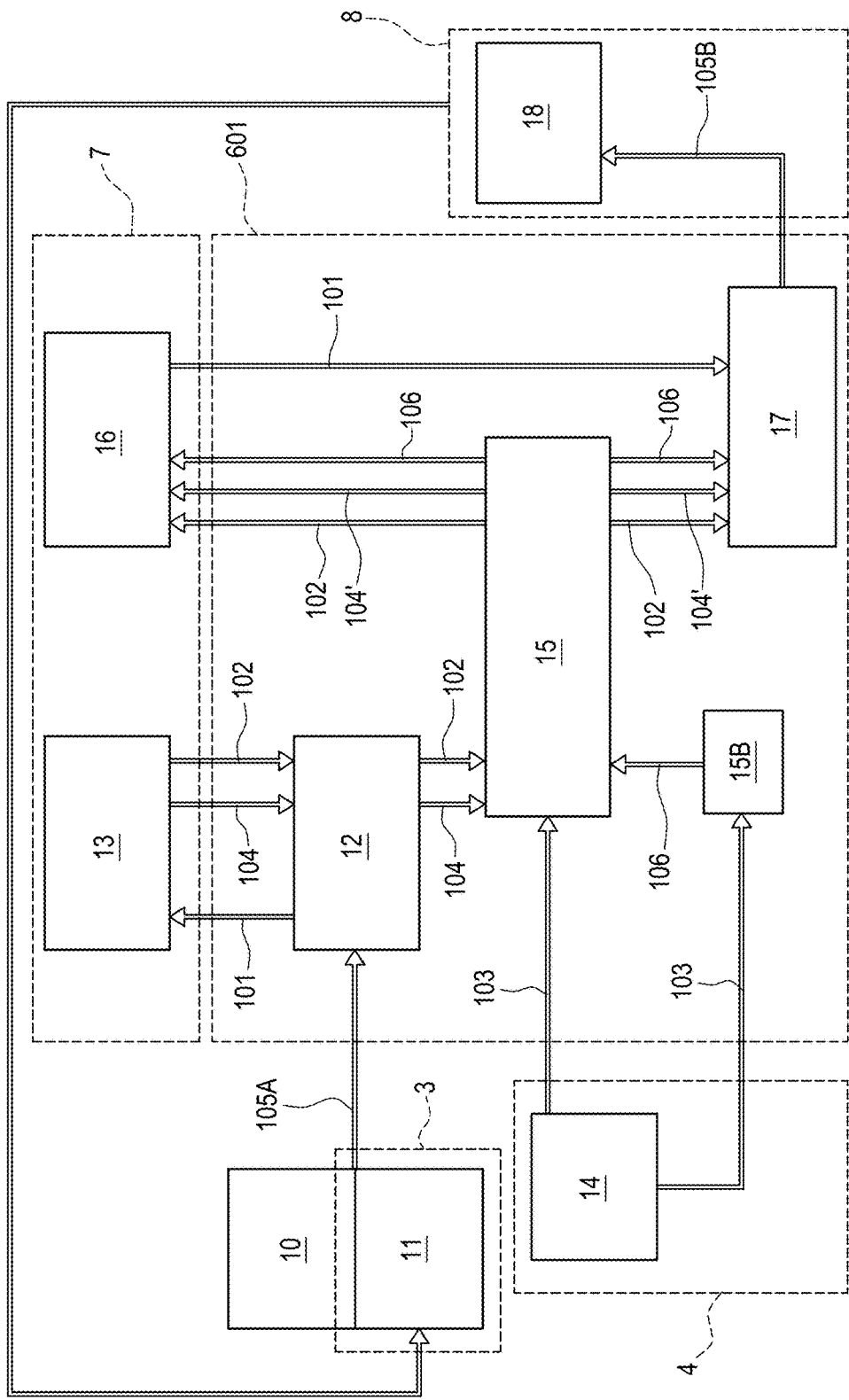
FIG. 7 illustrates a variant embodiment of the method of FIG. 6.

A wheel servicing system is a system designed to perform defined operations on the wheel in order to make it suitable for use. The wheel servicing system 1 described herein concerns operations for monitoring the wheel in order to determine the subsequent maintenance operations necessary for the wheel.

In one embodiment, the system 1 comprises a vehicle supporting structure 2. The vehicle supporting structure 2 comprises two guides 201 for the tyres. The vehicle supporting structure 2 comprises a plurality of locking elements 202 for locking the wheels in a predetermined position. In one embodiment, the predetermined position is configured to align a QR code reader 3 with the QR code 5A itself along a direction parallel to the axis of rotation of the wheel when mounted on the vehicle. In one embodiment illustrated in the drawings, the QR code 5A is positioned permanently on the vehicle. In this embodiment, the QR code 5A is printed on an adhesive substrate and then glued to a part of the car the code refers to. In one embodiment, the QR code 5A is glued to the chassis or to a door of the vehicle. In another embodiment, the QR code 5A is positioned permanently on the wheel. In one embodiment, the QR code 5A is printed on a paper substrate kept inside the vehicle but, if necessary, separable therefrom.

The system 1 comprises one or more measuring devices 4. In one embodiment, the one or more measuring devices 4 are connected to the supporting structure 2. In one embodiment, the one or more measuring devices 4 are movable relative to the supporting structure 2. In one embodiment, the one or more measuring devices 4 are aligned with the wheel along a direction parallel to the axis of rotation of the wheel. In one embodiment illustrated in the drawings, the system 1 has two measuring devices 4 aligned with the axis of rotation of a pair of wheels.

The measuring devices 4 are configured to capture measurement data 103 relating to the wheels. More specifically, the measurement data 103 may be one or more of those listed below: wheel toe, wheel camber, wheel caster, tyre tread depth, elasticity, residual imbalances of the wheels.

In one embodiment, the measuring devices 4 are also configured to transmit the data captured.

The system 1 comprises at least one QR code reader 3. In one embodiment, the reader 3 is included in the measuring device 4. It should be noted that the reader might also be built into the control unit 601 (for example, if it uses a built-in camera and has a QR code processing software).

In one embodiment, the reader 3 is, instead, portable. In another embodiment, the system 1 comprises a reader 3 built into the measuring device 4 and a portable reader 3.

In one embodiment, the QR code reader 3 is configured to capture and transmit input image data 105A correlated with the QR code 5A. In another embodiment, the QR code reader 3 is configured to capture the image data, convert the input image data 105A to alphanumeric format and transmit the converted data.

In one embodiment, the input image data 105A represent reference data 101. In another embodiment, the input image data 105A represent a history 104 of the measurement data captured, as well as the reference data 101.

In one embodiment, the reference data 101 are characteristic parameters 102 of the vehicle, of the wheels and of the owner.

In one embodiment, the reference data 101 represent at least one address which points to a filing location 701 in an electronic database 7. In one embodiment, the filing location 701 contains at least the values of the characteristic parameters 102. In another embodiment, the filing location 701 also contains the measurement data history 104. In one embodiment, the filing location 701 in the database 7 may also contain data of the customer (who may have two or more cars stored in the database).

In another embodiment, illustrated in the drawings, the reference data also include, in addition to the values of the characteristic parameters, an address which points to a filing location 701 in the electronic database 7.

The system 1 comprises a control station 6. In one embodiment, the control station 6 is connected to the supporting structure 2. In this embodiment, the control station 6 communicates with the measuring units 4 and with the reader 3 via a wired connection.

In another embodiment, the control station 6 is a remote station. In one embodiment, the control station 6 communicates with the measuring units 4 and/or with the readers 3 via a wireless connection.

In another embodiment, the connections between the control station 6 and the measuring devices 4, and between the control station 6 and the readers 3 are redundant and include both a wireless and a wired connection.

The control station 6 comprises a control unit 601. The control unit 601 comprises a memory and a processor. In one embodiment, the control station 6 comprises an input device 602 such as a keyboard or a touchscreen. In one embodiment, the control station 6 comprises an output device 603 such as a display. The control unit is connected to the measuring devices 4 and to the readers 3.

The control unit 601 is configured to receive the reference data 101. In one embodiment, the control unit 601 is configured to receive the reference data 101 entered manually from the keyboard 602. In one embodiment, the control unit 601 is configured to receive the data automatically from the reader 3. In another preferred embodiment, a mode of entering the reference data 101 manually and a mode of receiving the reference data 101 automatically are integrated in the control unit 601, to the advantage of the reliability of the system 1. The control unit 601 is configured to receive the measurement data 103 from the measuring units 4.

The system 1 comprises the aforementioned electronic database 7. In one embodiment, the electronic database 7 is local. In another embodiment, the electronic database 7 is remote and can be accessed from any station connected to the Internet.

The control unit 601 is connected to the electronic database 7. In one embodiment, the control unit 601 is connected via a wireless connection 702. In one embodiment, the control unit 601 is configured to communicate with the electronic database 7 and queries it as a function of the reference data 101. The electronic database 7 is configured to receive an input request and to send the requested information to the control unit 601.

In one embodiment, the control unit 601 is configured to communicate with the electronic database 7 and to send, as a function of the results 106 of the diagnosis performed, the history 104 of the updated measurement data and the characteristic parameters, which have presumably remained unchanged. The electronic database 7 is configured to receive an input save request and to send to the control unit 601 the information relating to a new filing location 701.

The control unit is configured to generate, as a function of the reference data 101 (if necessary updated according to the information received from the electronic database 7) and, if necessary, also as a function of the updated measurement data history 104, output image data 105B correlated with an output QR code 5B. In other words, the control unit 601 is configured to receive the input QR code 5A containing a data set, to process the data set as a function of the measurement data 103 and to generate the output QR code 5B containing the same data set updated as a function of the results of the diagnosis.

It should be noted that in at least one embodiment, the two QR codes (5A and 5B) may be identical (for example when, as is often the case, they contain only the address to the database).

The system 1 comprises an output peripheral. In one embodiment, illustrated in the drawings, the output peripheral is a printer 8. The printer 8 is connected to the control unit 601. In one embodiment, data transmission between the control unit 601 and the printer 8 is accomplished via a wireless connection. In another embodiment, data transmission between the control unit 601 and the printer 8 is accomplished via a wired connection.

The printer 8 is configured to receive the output image data 105B. The printer 8 is configured to print the output QR code 5B as a function of the output image data 105B. In one embodiment, the printer 8 prints on an adhesive, plasticized substrate 801. The adhesive substrate 801 comprises an adhesive coated face 801A. The adhesive substrate comprises a non-adhesive face 801B on which the output QR code 5B is printed. In another embodiment, the printer 8 prints on a paper substrate which is then placed inside the vehicle. In one embodiment, the adhesive substrate 801 comprises an adhesive film which is applied during positioning on the vehicle.

In one embodiment, the printer 8 is a thermal printer. The printer 8 may be provided with a roll of thermal adhesive paper. The thermal adhesive paper may have a corporate logo preprinted on it.

In one embodiment, the QR code generated is glued to a door of the vehicle at a position which is hidden from view when the door is closed in such a way as to protect it from damage. In another embodiment, the QR code is glued to a tyre. In another embodiment, the QR code is glued to the door of the vehicle at a position which is visible when the door is closed.

In one embodiment, the printer 8 is provided with a connection to the Internet; for example, it includes a GSM modem for connectivity to the worldwide web.

In another embodiment, not illustrated, the output peripheral is a digital device provided with a display. In this embodiment, the control unit 601 sends the output image data 105B to the digital device, which processes the image and shows it on its display, making it scannable and visible to the user.

In one embodiment, the output QR code 5B is integrated with an image representing a logo. In one embodiment, the logo is a corporate logo.

The drawings also show a functional diagram of the wheel servicing method. The method comprises the following steps.

A first step of the method comprises entering reference data 101 in a control unit 601. This data entry step is, in one embodiment, a manual data entry step 10. In this embodiment, the vehicle owner does not possess an input QR code 5A and is presumably using the wheel servicing system 1 for the first time. In another embodiment, the data entry step is an automatic data entry step 11. The automatic data entry step 11 is accomplished by positioning a reader 3 in the proximity of an input QR code 5A. The reader 3 automatically transmits the reference data to the control unit 601. In one embodiment, the reader 3 transmits input image data 105A not yet converted into alphanumeric series. In another embodiment, the reader 3 performs a step of converting the input image data 105A followed by a step of transmitting the alphanumeric series only after that has been done.

A further step 12 of the method comprises receiving the reference data by the control unit 601. In a variant embodiment of the system 1, where the reference data indicate only one filing location 701 in an electronic database 7, the method comprises a data capturing step 13. During this step, the control unit 601 queries the electronic database 7 regarding the specific filing position 701 addressed by the reference data 101. In one embodiment, the electronic database 7 responds to the control unit by sending the value of characteristic vehicle parameters 102. In one embodiment, the electronic database 7 responds to the control unit by sending the value of characteristic vehicle parameters 102 and the history 104 of the measurement data 103.

In one embodiment, the wheel servicing method comprises a step 14 of measuring the measurement data 103 performed on the vehicle during diagnosis. The measuring step 14 is performed by one or more measuring devices 4. In one embodiment, when the measuring step 14 has been completed on the vehicle wheels, the one or more measuring devices 4 transmit the measurement data 103 automatically to the control unit 601.

The method comprises a step 15 of processing the reference data 101 to generate (in a subsequent or concurrent step of the method) image data 105B representing a QR code containing at least the reference data.

In one embodiment, the measuring step 15 includes processing the measurement data 103. The step of processing the measurement data 103 is carried out so that image data 105B representing a QR code to contain also the measurement data 103 can be generated in a subsequent step of the method.

In one embodiment, the processing step 15 may include comparing the characteristic vehicle parameters 102 received previously with the measurement data 103 received from the measuring device 4. In one embodiment, the comparison is also performed by assessing the history 104 of the measurement data.

In one embodiment, there is a step 15B of generating a report (in one embodiment, after the step of processing the measurement data 103); the step 15B of generating the report may be carried out by means of the control unit.

In one embodiment, the report includes one or more of the following items: diagnosis results 106 and maintenance measures necessary; characteristic vehicle parameters 102 (substantially unchanged compared to those derived from reading the QR code); measurement data 103 captured and updated history 104 of the measurement data.

In one embodiment, the method comprises a step 16 of saving the report, containing the aforementioned information, in the electronic database 7 at a filing location 701. In the saving step 16, the address of the filing location 701 may be the same as the preceding address or a different address, depending on the filing logic of the electronic database 7. If the address of the filing location 701 is different from that specified in the reference data 101, the electronic database 7 responds to the control unit by sending an updated address and the reference data 101 are updated accordingly. In one embodiment, the electronic database 7 allocates, for each vehicle, a memory space with invariant address; in such a case, the reference data 101 are (preferably) not updated.

The method comprises a step 17 of generating output image data 105B. In one embodiment, the control unit 601, after receiving the updated reference data 101 from the electronic database 7, selects the information to be saved in the output QR code 5B.

In one embodiment, the data captured in the measuring step 14 are used directly for the generating step 17.

In one embodiment, the generating step 17 comprises generating image data representing the reference data 101 corresponding to the address where all the information has been saved. In one embodiment, the generating step 17 comprises generating output image data 105B representing reference data 101, which are characteristic vehicle parameters 102. In another embodiment, the generating step 17 comprises generating output image data 105B representing reference data 101, which are characteristic vehicle parameters 102 and the address in which all the information is saved. Lastly, in yet another embodiment, the generating step 17 comprises generating output image data 105B representing reference data 101, which are characteristic vehicle parameters 102 and the address in which all the information is saved, and representing the history 104 of the measurement data.

The method comprises a step 18 of making the output QR code 5B available to the user for displaying. In this step, an output peripheral receives the output image data 105B and processes them in such a way as to make them visible to the user. In a variant embodiment of the system, where the output peripheral is a printer 8, the image data 105B are converted to print data. The printer 8 prints the output QR code 5B on an adhesive substrate 801. In this embodiment, the user can decide whether to stick the adhesive substrate to the vehicle or keep it inside the vehicle without attaching it thereto. In another embodiment, the method comprises transmitting the output image data 105B to a digital device provided with a display. The digital device processes the output image data 105B and sets the display parameters in such a way as to display the output QR code 5B.

The invention claimed is:

1. A wheel servicing method for a wheeled vehicle with tyres coupled to respective rims, the method comprising:
   receiving, in a control unit provided with a processor and a memory, reference data uniquely correlated with the vehicle;
   capturing first measurement data relating to at least one wheel of the vehicle, the first measurement data being obtained at a first diagnosis time;
   capturing second measurement data relating to said at least one wheel of the vehicle, the second measurement data being obtained at a second diagnosis time subsequent to the first diagnosis time;
   processing the reference data and generating image data representing a QR code containing the reference data;
   processing the first and second measurement data as a function of the reference data;
   including at least part of the first measurement data and at least part of the second measurement data in the image data representing the QR code, for keeping track of measurement data obtained at successive diagnosis times; and
   transmitting the QR code to an output peripheral in order to make the code available to a user for subsequent displaying.

2. The method according to claim 1, further comprising printing the QR code on an adhesive substrate by means of the output peripheral.

3. The method according to claim 1, wherein the first and second measurement data include one or more of the following parameters:
   wheel toe;
   wheel camber;
   wheel caster.

4. The method according to claim 1, wherein the control unit receives the reference data by reading the QR code and then derives the image data representing at least the reference data.

5. The method according to claim 1, wherein at least some of the reference data are characteristic vehicle parameters and comprise one or more of the following parameters:
   car code;
   wheel size;
   customer code;
   manufacturer, marque and model of vehicle;
   wheel parameters;
   tolerance range for wheel measurement data;
   vehicle identification code.

6. The method according to claim 1, wherein the reference data refer to a location in an electronic database containing one or more of the characteristic vehicle parameters from the following list:
   car code;
   wheel size;
   customer code;
   manufacturer, marque and model of vehicle;
   wheel parameters;
   tolerance range for wheel measurement data;
   vehicle identification code.

7. The method according to claim 6, wherein the electronic database also contains at least part of the first and second measurement data comprising one or more of the following parameters:
   wheel toe;
   wheel camber;
   wheel caster.

8. The method according to claim 1, wherein the image data representing the QR code are integrated with other image data representing a logo in such a way as to form a QR code representing at least the reference data and depicting the logo.

9. The method according to claim 1, wherein the output peripheral makes the QR code visible on a digital device through a user interface.

10. A wheel servicing system for a wheeled vehicle with tyres coupled to respective rims, comprising:
    a control unit provided with a processor and a memory;
    a user interface connected to the control unit and configured to receive reference data uniquely correlated with the vehicle and to transmit them to the control unit;
    one or more measuring devices configured to capture, at a first diagnosis time, first measurement data relating to at least one wheel of the vehicle, and, at a second diagnosis time subsequent to the first diagnosis time, second measurement data relating to said at least one wheel, wherein said one or more measuring devices are connected to the control unit to transmit the first measurement data and the second measurement data to the control unit;
    an output peripheral connected to the control unit;
    wherein the control unit is programmed to process the reference data, and to process the first and second measurement data as a function of the reference data, to generate image data representing a QR code, the QR code including the reference data, at least part of the first measurement data and at least part of the second measurement data, for keeping track of measurement data obtained at successive diagnosis times;

and wherein the control unit is configured to transmit the QR code to the output peripheral, which is configured to make the QR code available to a user for subsequent displaying.

11. The wheel servicing system according to claim 10, wherein the output peripheral is a printer configured to print the QR code on an adhesive substrate.

12. The wheel servicing system according to claim 10, comprising a reader configured to read the QR code and to derive the image data representing the reference data.

13. The wheel servicing system according to claim 10, wherein the output peripheral is configured to make the QR code visible on a digital device through a user interface.

14. The wheel servicing system according to claim 10, comprising a memory used to store an electronic database containing one or more of the items from the following list:
   car code;
   wheel size;
   customer code;
   manufacturer, marque and model of vehicle;
   wheel parameters;
   tolerance range for wheel measurement data;
   vehicle identification code;
   measurement data relating to wheel toe;
   measurement data relating to wheel camber;
   measurement data relating to wheel caster.

15. A computer-readable medium storing operating instructions for performing the steps of the method according to claim 1 when executed by a processor provided to a wheel servicing system, the wheel servicing system comprising:

a control unit comprising the processor and a memory;

a user interface connected to the control unit and configured to receive reference data uniquely correlated with a vehicle and to transmit them to the control unit;

one or more measuring devices configured to capture, at a first diagnosis time, first measurement data relating to at least one wheel of the vehicle, and, at a second diagnosis time subsequent to the first diagnosis time, second measurement data relating to said at least one wheel of the vehicle, wherein said one or more measuring devices are connected to the control unit to transmit the first measurement data and the second measurement data to the control unit an output peripheral connected to the control unit;

wherein the control unit is configured to process the reference data, and to process the first and second measurement data as a function of the reference data, to generate image data representing a QR code, the QR code including the reference data, at least part of the first measurement data and at least part of the second measurement data, for keeping track of measurement data obtained at successive diagnosis times;

and wherein the control unit is configured to transmit the QR code to the output peripheral, which is configured to make the QR code available to a user for subsequent displaying.

* * * * *